United States Patent [19]

Taguchi et al.

[11] Patent Number: 4,631,356

[45] Date of Patent: Dec. 23, 1986

[54] COORDINATE INPUT DEVICE WITH DISPLAY

[75] Inventors: Yoshinori Taguchi; Tsuguya Yamanami, both of Ageo, Japan

[73] Assignee: Wacom Co., Ltd., Saitama, Japan

[21] Appl. No.: 707,311

[22] Filed: Mar. 1, 1985

[30] Foreign Application Priority Data

Mar. 6, 1984 [JP] Japan ................... 59-41376

[51] Int. Cl.[4] ............................................. G08C 21/00
[52] U.S. Cl. ...................................... 178/19; 340/784
[58] Field of Search ........................... 178/19, 18, 20; 340/365 L, 706, 709, 784

[56] References Cited

U.S. PATENT DOCUMENTS 4,205,199 5/1980 Mochizuki ........................... 178/19

Primary Examiner—Stafford D. Schreyer
Attorney, Agent, or Firm—Pollock, Vande Sande & Priddy

[57] ABSTRACT

A coordinate input device with a display has a tablet having two orthogonal position detecting sections each having elongated magnetic bodies and a plurality of exciting lines and a plurality of detecting lines which are arranged alternately such as to cross the magnetic bodies orthogonally thereto. These position detecting sections are superposed such that their magnetic bodies, exciting lines and detecting lines cross orthogonally. A tabular display is superposed on the tablet. The device further has a position appointing magnetism generator adapted for imparting local biases to the exciting lines of the position detecting sections. The exciting lines of the tablet are supplied with A.C. current of a predetermined frequency by a driving current source. A position detecting circuit is designed for detecting the corrdinate values of a position appointed by the position appointing magnetism generator through detection of voltage induced in the detecting lines in the tablet. The display is driven by a display control circuit. The operation of the above-mentioned constituents is controlled by a processor. With this arrangement, it is possible to input corrdinate data to the tablet by the position appointing magnetism generator with a high precision and by a simple operation from a remote position above the tablet, and the coordinate data or image information formed by these coordinate data can be visually checked directly on the display.

4 Claims, 10 Drawing Figures

COORDINATE INPUT DEVICE WITH DISPLAY

BACKGROUND OF THE INVENTION

1. Field of the Invention

The present invention relates to a coordinate input device with display which permits an easy inputting of coordinate position data through position appointment by, for example, a magnetic pen and capable of displaying the inputted coordinate positions or image information on the basis of such coordinate position data.

2. Description of the Prior Art

Hitherto, devices have been proposed for inputting and outputting characters or patterns, in which a tablet, through which hand written characters and patterns are inputted and a display on which the written characters and the result of recognition are displayed, are arranged independently. With these devices, the user has to watch the tablet and the display alternately in order to input the characters and patterns through the tablet while confirming correct inputting of such characters and patterns. This seriously impedes the work for inputting of a sentence by hand writing. Furthermore, editing work such as correction and insertion of words and characters is seriously hindered because of the necessity for moving the cursor to the designated position in the sentence while checking up the present position of the cursor with the designated position in the original document.

To avoid this problem, input/outpu devices have been proposed as in, for example, Japanese Patent Laid-Open No. 144287/1983 in which the tablet and the display are integrated with each other in such a manner as to permit the user to directly appoint any desired position in the displayed document by means of a stylus pen connected to a character recognition circuit, thus facilitating the editing and inputting/outputting operations. With this arrangement, the user can form a document quite easily as if he is making lay-out and writing directly on an output paper sheet, simply by writing a sentence in accordance with the input format shown on the tablet.

This input/output device, however, still suffers from disadvantage in that the writing of characters and patterns on the tablet is hindered by a cord through which the stylus pen is connected to a character recognition circuit, and in that appointment of characters or position at a high precision is faulty unless the stylus pen is held in contact with or in close proximity to the tablet.

SUMMARY OF THE INVENTION

It is a first object of the invention to provide a coordinate input device with display comprising: a tablet including X- and Y-direction position detecting sections each having substantially parallel elongated magnetic bodies and a plurality of exciting lines and a plurality of detecting lines which are arranged alternately such as to cross the magnetic bodies orthogonally thereto; a driving current source adapted to supply A.C. current of a predetermined frequency to the exciting lines; a position appointing magnetism generator for applying a local magnetic bias to the magnetic bodies; and a detecting means for detecting the position appointed by the position appointing magnetism generator by detecting the voltages induced in the detecting lines.

According to this arrangement, a change in the magnetic flux between the exciting line and the detecting line is made only within the magnetic body so that a close electromagnetic coupling between the exciting line and the detecting line is attained thus ensuring a high level of detection voltage with a high S/N ratio, while minimizing the induction by external noise, as well as minimized induction noise to other devices in the surrounding environment. In addition, since the position can be appointed by applying only a small magnetic bias to the magnetic body, it is not necessary to bring the position appointing magnetism generator to the close proximity of the magnetic body. In consequence, the effective reading height, i.e., the range of height of the magnetism generator above the magnetic body within which the position reading can be made satisfactorily, is increased advantageously. In fact, it is possible to place a metal other than a ferromagnetic metal between the position appointing magnetism generator and the magnetic body. In addition, since the exchange of signal such as the timing signal between the position appointing magnetism generator and the stationary part of the apparatus is unnecessary, the need for a connecting means such as cord can be eliminated, thus improving the handling of the position appointing magnetism generator.

It is a second object of the invention to provide a coordinate input device with display in which a tabular display is superposed on the tablet such that the X- and Y-direction position data appointed on the tablet are directly displayed on the display for easy and clear confirmation, while avoiding undesirable doubling of data image due to parallax.

It is a third object of the invention to provide a coordinate input device with display in which exchange of timing detection signal between the position appointing magnetism generator and the stationary part of the device and, hence, the necessity for cord are omitted to improve the handling of the position appointing magnetism generator during the operation while improving the visibility of the display.

It is a fourth object of the invention to provide a coordinate input device with display in which the inputting can be made if only a slight magnetic bias is applied to the magnetic bodies through the display regardless of the kind and thickness of the display, and the inputting can be made even by tracing the characters or patterns written in a document placed on the display.

These and other objects, features and advantages of the invention will become clear from the following description of the preferred embodiments when the same is read in conjunction with the accompanying drawings.

DESCRIPTION OF THE PREFERRED EMBODIMENTS

Figure 1:
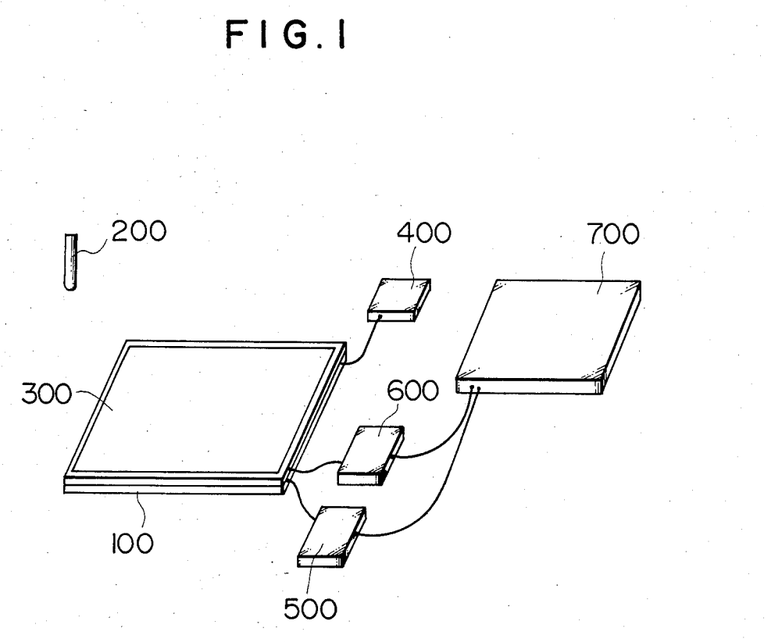
FIG. 1 is a schematic perspective view of a coordinate input device with display in accordance with the invention.

Refering to FIG. 1 which is a perspective view showing the outline of an embodiment of the invention, the coordinate input device of the invention generally has a tablet 100 for inputting the coordinate data, a position appointing magnetism generator (referred to simply as "magnetic pen", hereinunder) for appointing the coordinate position, a tabular display 300 superposed on the tablet 100, a driving current source 400 adapted to produce an A.C. current of any desired waveform such as sine-wave form, rectangular waveform, triangular waveform and so forth at a predetermined frequency, a position detecting circuit for detecting the coordinate values of the position appointed by the magnetic pen 200 on the tablet 100, a display control circuit for driving the dispay 300, and a processor 700.

Figure 2:
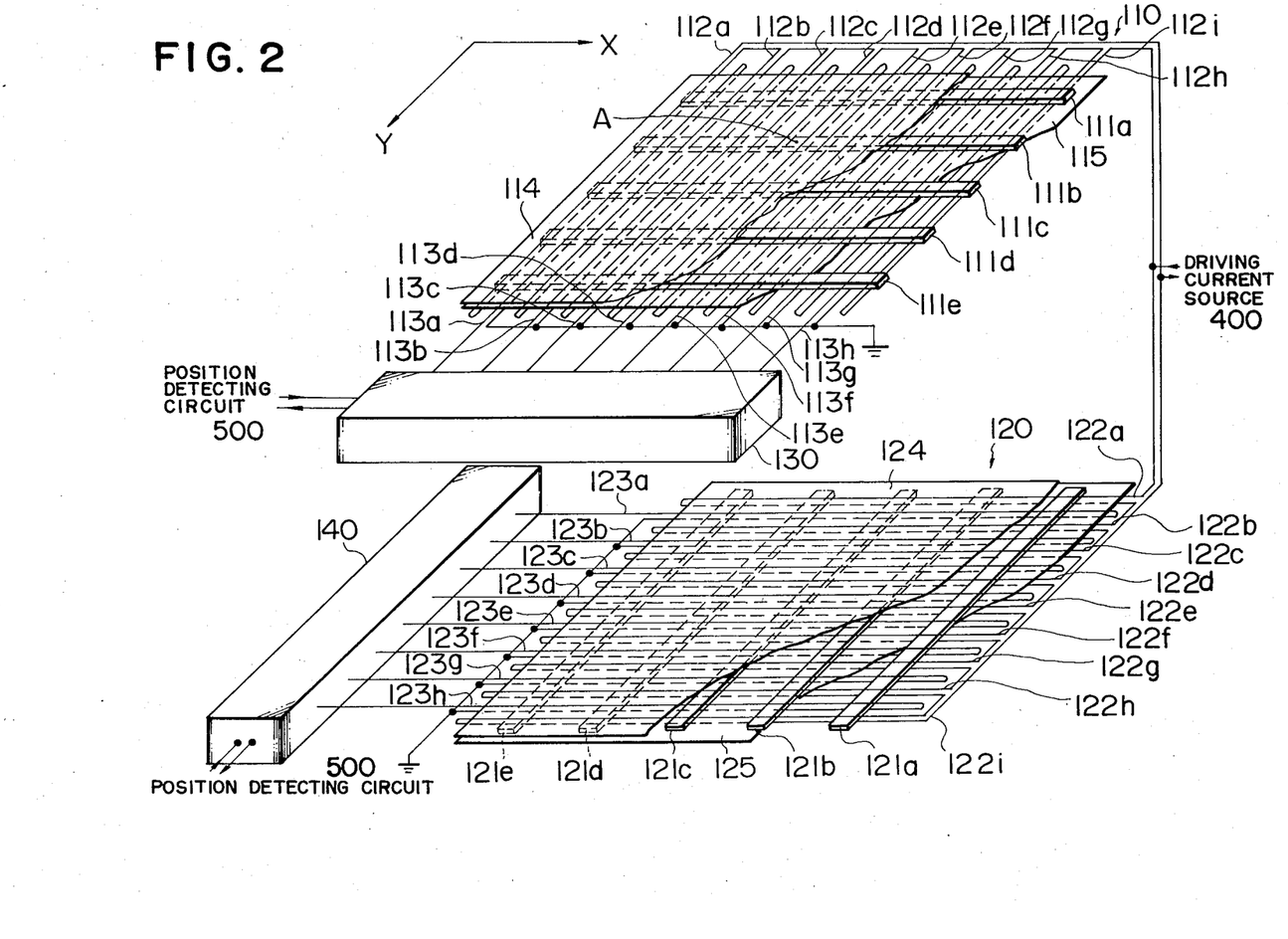
FIG. 2 is a partly cut-away exploded perspective view showing the major part of a tablet.
Figure 3:
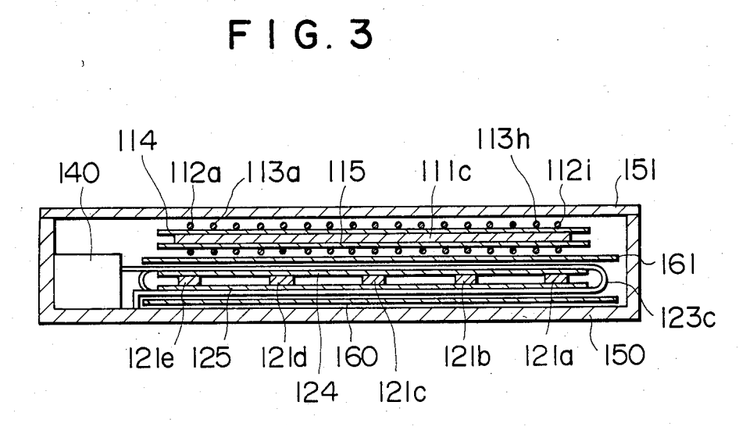
FIG. 3 is s sectional view of an essential portion of the tablet.

FIG. 2 is a partly cut-away exploded perspective view showing the major part of a tablet, while FIG. 3 is a sectional view of an essential part.

An X-direction position detecting section 110 is composed of elongated magnetic bodies 111a–111e, exciting lines 112a to 112i, detecting lines 113a to 113h and insulating sheets 114 and 115. The magnetic bodies 111a to 111e are sandwiched between both insulating sheets 114 and 115 such as to extend in an X-direction in parallel with one another.

The magnetic bodies 111a to 111e are made of a material which can hardly be magnetized even when approached by a magnet, i.e., a material having a small coercive force and a high magnetic permeability ($\mu$). Examples of such a material are amorphous alloys, permalloys and so forth. A typical example of the amorphous alloys usable as the material of the magnetic bodies 111a to 111e is an alloy expressed by $Fe_{79}B_{16}Si_5$ (atom %) which has a coercive force of 0.2 Oe and a magnetic permeability $\mu$ of 14,000. The magnetic bodies 111a to 111e have an elongated thin web-like form with a rectangular cross-section or an elongated linear form with a circular cross-section.

When the thin web-like form is adopted, the magnetic body preferably has a width of about several millimeters and a thickness which ranges between several and several tens of micron meters ($\mu$m) because such a width and thickness facilitate its production and ensures an excellent performance. In general, amorphous alloy can be produced in the form of a thin ribbon having a thickness of 20 to 50 $\mu$m, so that the magnetic bodies can be produced by cutting such ribbons into segments. The amorhous alloy can be produced also in the form of a line having a circular cross-section, which line may be cut into segments to be used as the magnetic bodies.

Each of the exciting lines 112a to 112i has an upper half part laid on the upper side of the insulating sheet 114 and a lower half part laid in contact with the lower side of the insulating sheet 115. The upper and lower half parts of respective exciting lines 112a to 112i are connected at their adjacent ends to each other. In addition, the other ends of the lower half parts of the exciting lines 112a, 112b, 112c, 112d, 112e, 112f, 112g and 112h are connected to the other ends of the upper half parts of the exciting lines 112b, 112c, 112d, 112e, 112f, 112g, 112h and 112i, respectively. Thus, the exciting lines 112a to 112i are connected in series, and the other end of the upper half part of the exciting line 112a and the other end of the lower half part of the exciting line 112i are connected to the driving current source 400. The exciting lines 112a to 112i are arranged at a predetermined pitch such as to orthogonally cross the magnetic bodies 111a to 111e.

Each of the detecting lines 113a to 113h has an upper half part arranged on the upper side of the insulating sheet 114 and a lower half part arranged to be in contact with the lower side of the insulating sheet 115. The upper and lower half parts of each detecting line are connected at their one ends. The other ends of the upper half parts of the detecting lines 113a to 113h are connected to a multiplexer 130, while the other ends of the lower half parts of the same are grounded commonly. The detecting lines 113a to 113h are arranged between adjacent exciting lines 112a to 112i such as to orthogonally cross the magnetic bodies 111a to 111e.

A Y-direction position detecting section 120 is composed of elongated magnetic bodies 121a to 121e, exciting lines 122a to 122i, detecting lines 123a to 123h and insulating sheets 124 and 125. The construction of the Y-direction position detecting section 120 is substantially identical to that of the X-direction position detecting section 110. The exciting lines 122a to 122i are connected to the driving current source 400, while the detecting lines 123a to 123h are connected at their one ends to a multiplexer 140 and commonly grounded at their other ends.

The Y-direction position detecting section 120 is secured to the inner bottom surface of a non-magnetic metallic case 150 through an insulating sheet 160, while the X-direction position detecting section 110 is superposed to the Y-direction position detecting section as closely as possible thereto through the intermediary of an insulating sheet 161, such that the magnetic bodies, exciting lines and the detecting lines of both sections 10,120 cross orthogonally. The X- and Y-position detecting sections are fixed by an adhesive as required. The multiplexers 130 and 140 also are mounted and fixed in the metallic case 150. A cover 151 made of a non-magnetic metallic material is fitted to the top of the metallic case 150.

Figure 4:
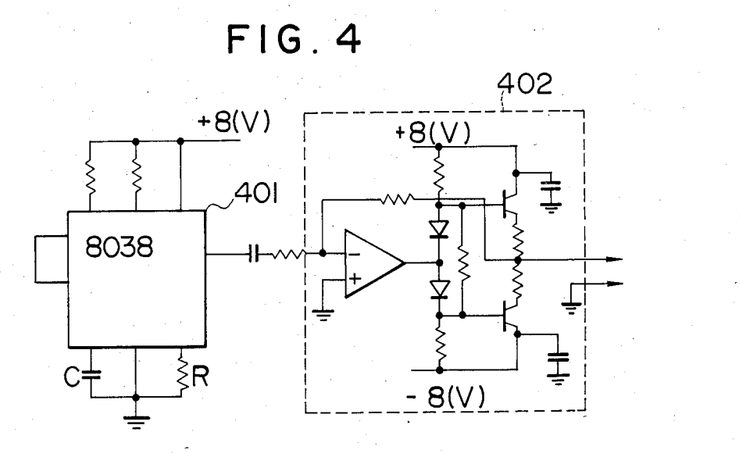
FIG. 4 is a circuit diagram of a practical example of a driving current source.

FIG. 4 shows a practical example of the driving current source 400. The driving current source has a function generator 401 which may be an IC 8038 made by Inter Sil. adapted to produce a sine wave signal of a suitable frequency which is determined by the capacitance of the capacitor C and the resistance of the resistor R. A numeral 402 denotes a power driver which is constituted by an operation amplifier and a differential amplifier. The power driver is adapted to effect a current-amplification of the sine wave signal and to deliver the amplified signal to the exciting lines 112a to 112i and 122a to 122i.

Figure 5:
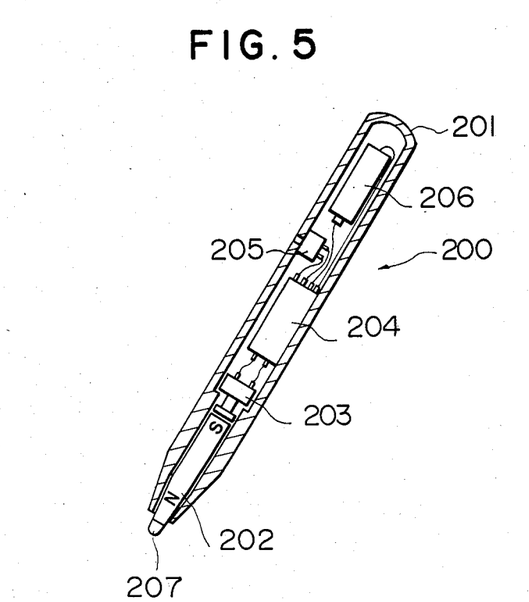
FIG. 5 is a sectional view of a magnetic pen.
Figure 6:
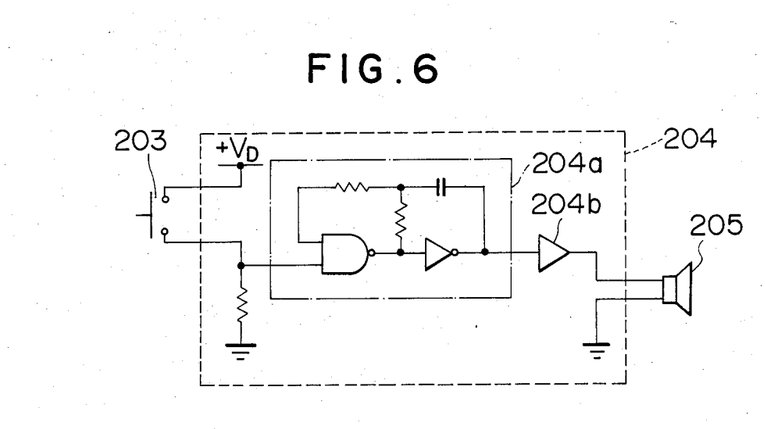
FIG. 6 is a circuit diagram of the magnetic pen.

FIG. 5 is a sectional view of a practical example of the magnetic pen 200, while FIG. 6 is an electric circuit diagram of the same. The magnetic pen 200 has a pen-shaped vessel 201 made of a plastic or a similar material. A bar magnet 202 is axially slidably mounted on one end of the vessel 201, such that one end of the bar magnet 202 is projectable from the end of the vessel 201. An operation switch 203 is mounted such as to oppose the other end of the bar magnet 202. A supersonic signal generator 204, battery 206 and a supersonic transmitter 205 are accommodated by the vessel 201 at suitable portions thereof. A rubber cover 207 is secured to the end of the bar magnet 202. In operation, the user holds the vessel 201 and presses the end of the bar magnet 202 covered by the rubber cover 207 onto the input surface. As a result, the bar magnet 202 is moved into the vessel 201 thus turning the switch 203 on, thereby activating the oscillation circuit 204a and the amplifier 204b in the generator 204, so that a signal representing the commencement of the measurement, e.g., a continuous pulse signal of a predetermined frequency, is changed into a supersonic signal which is then transmitted from the transmitter 205.

The display 300 may be a known matrix-type liquid crystal display panel in which liquid crystal mediums are sandwiched between a plurality of horizontal and vertical electrodes crossing each other. The display 300 preferably has a display area equal to the input area on the tablet, and is mounted such that the coordinate positions on the display correspond to those on the tablet 100.

Figure 7:
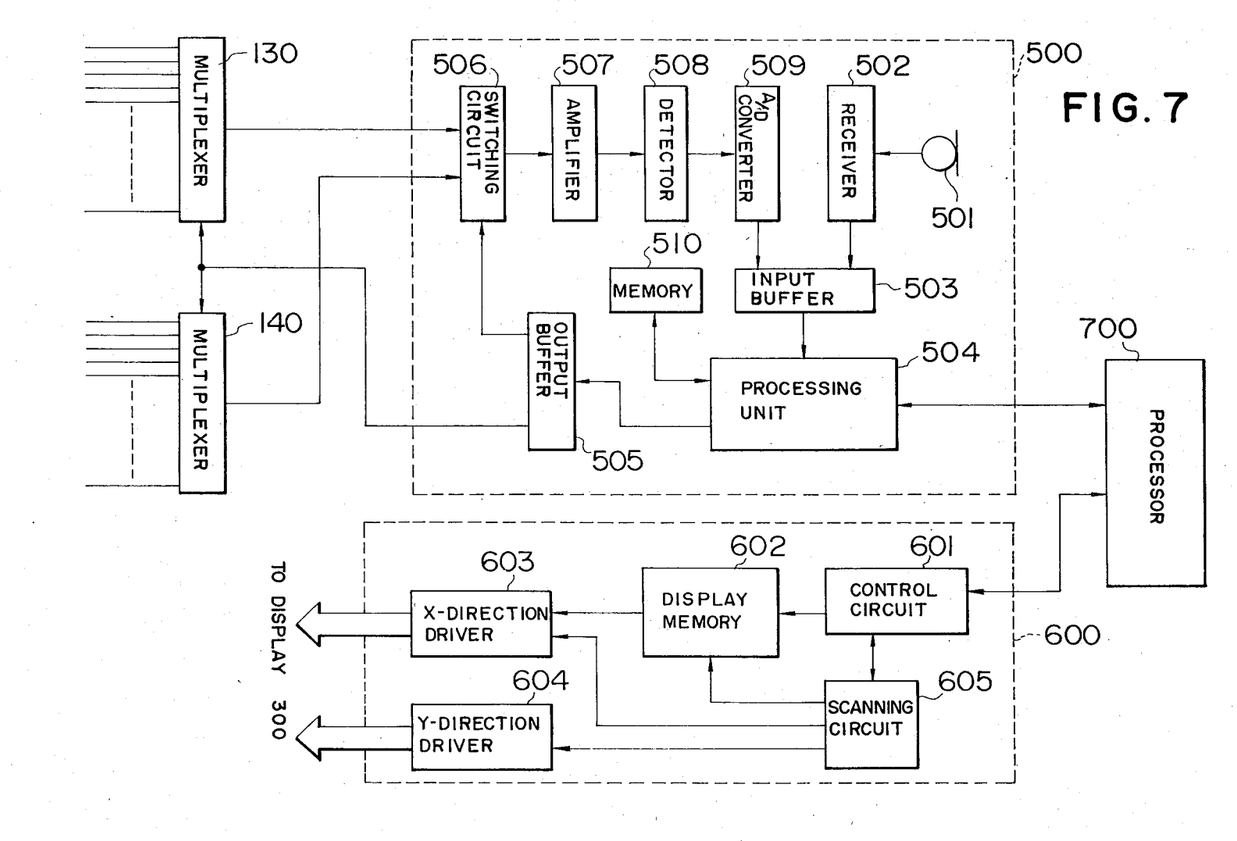
FIG. 7 is a block diagram of an essential part of the coordinate input device.

FIG. 7 is a block diagram of an essential portion of the device of the invention. The operation of the device and the functions of the blocks wll be explained hereinunder.

Figure 8:
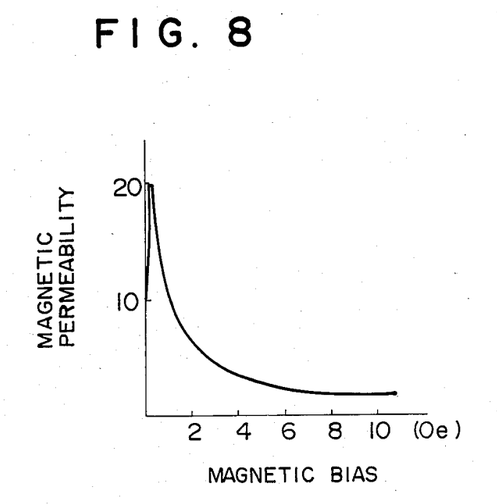
- FIG. 8 is a chart showing the relationship between magnetic bias and magnetic permeability.

As a result of the supply of the A.C. currents to the exciting lines 112a to 112i and 122a to 122i, voltages are induced in the detecting lines 113a to 113h and 123a to 123h by electromagnetic induction. Since this electromagnetic induction is made through the magnetic bodies 111a to 111e and 121a to 121e, the levels of the induced voltages are increased as the magnetic permeability of the magnetic bodies 111a to 111e and 121a to 121e is increased. On the other hand the magnetic permeabilities of the magnetic bodies 111a to 111e and 121a to 121e are changed in a manner shown in FIG. 8 by an external magnetic bias. It will be seen that the magnetic permeability is drastically decreased as the magnetic bias is increased. Therefore, if a magnetic bias is applied to the magnetic bodies 111a to 111e and 121a to 121e, the levels of the voltages induced in the detecting lines 113a to 113h and 123a and 123h by the A.C. currents in the exciting lines 112a and 112i and 122a to 122i is decreased drastically.

Referring again to FIG. 1, it is assumed here that the position appointing magnetism generator 200, with its N-pole directed downwardly, is held in contact with the input surface (top surface of the display 300 in this case) at a position A which is spaced in the X-direction by a distance $x_s$ from the detecting line 113a and in the Y-direction by a distance $y_s$ from the detecting line 123a, and a magnetic bias of a level just capable of reducing the magnetic permeability is applied to the magnetic bodies 111b and 121d.

Figure 9:
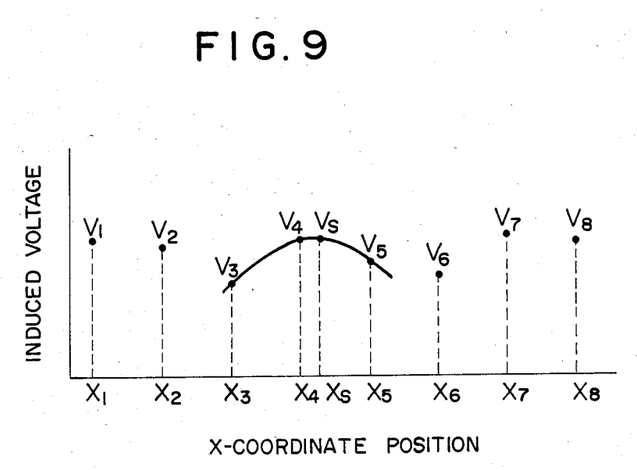
FIG. 9 is a graph exemplarily showing an induction voltage produced in X-direction detecting lines.

In this state, induced voltages $V_1$ to $V_8$ are generated in the X-direction detecting lines 113a and 113h as shown in FIG. 9. More specifically, in FIG. 9, the axis of abscissa represents the X-direction coordinate position in which $x_1$ to $x_8$ represent the positions of the detecting lines 113a to 113h, while the axis of coordinate represents the voltage. It will be seen that the voltages $V_1$ to $V_8$ draw a curve which has a peak at a point corresponding to the position A. At each side of the peak position, the voltage is once decreased and then increased again as the distance from the peak position is increased. This is attributable to the fact that the magnetic flux produced by the bar magnet 202 coming into the magnetic body 111b crosses the magnetic body 11b substantially orthogonally when the magnetic body 111b is at the position just under the bar magnet 200 so that the magnetic permeability is influenced only slightly, whereas, when the bar magnet 200 is disposed at either side of the magnetic body 111b, the magnetic flux passing the magnetic body 111b in the longitudinal direction thereof is increased to cause an appreciable reduction in the magnetic permeability.

On the other hand, since the end of the bar magent 202 of the magnetic pen 200 is pressed onto the input surface, the switch 203 is turned on so that the supersonic signal indicative of the commencement of the measurement is transmitted from the transmitter 205 and is received by a receiver 501. The received signal is then amplified and shaped by a receiving device 502 and sent to an input buffer 503. A computing circuit 504 reads the measurement commencement signal from the input buffer, thus acknowledging the commencement of the measurement. Then, the computing circuit 504 delivers control signals to a switching circuit 506 and a multiplexer 130 through an output buffer 505, thus allowing the voltages induced in the X-direction detecting lines 113a to 113h to be successively delivered to the amplifier 507. The induced voltages are amplified by an amplifier 507 and, after a rectification and conversion into D.C. voltages by a detector 508, converted into digital values by an analog-to-digital (A/D) converter 509. These digital signals are delivered to the computing circuit 504 through the input buffer. The computing circuit 504 then temporarily stores the digital values corresponding to the induced voltages in a memory 510 thereof and computes the X-direction coordinate value $x_s$ of the point A using the thus stored data.

Various methods can be used for the computation of the coordinate value $x_s$.

One of the computing methods for computing the coordinate value $x_s$ will be explained hereinunder. The waveform of the portion of the curve drawn by the induced voltages around the peak point is approximated by a suitable function. For instance, representing the pitch of the detecting lines 113a to 113h by $\Delta x$, the portion of the curve between the x-coordinate positions $x_3$ and $x_5$ is approximated by a function of secondary degree shown by the solid line curve in FIG. 9. Using this function, the coordinate value of the peak position can be determined as follows:

The following relationships are obtained from the coordinate positions of respective detecting lines and the voltages induced in these detecting lines:

$$V_3 = a(x_3 - x_s)^2 + b \tag{1}$$

$$V_4 = a(x_4 - x_s)^2 + b \tag{2}$$

$$V_5 = a(x_5 - x_s)^2 + b \tag{3}$$

where, a and b are constants (a < 0)
The following relationships also exist:

$$x_4 - x_3 = \Delta x \tag{4}$$

$$x_5 - x_3 = 2\Delta x \tag{5}$$

The following equation (6) is derived by trimming the formulae (2) and (3) after substituting formulae (4) and (5) to the formulae (2) and (3)

$$x_s = x_3 + \frac{\Delta x}{2}\left(\frac{3V_3 - 4V_4 + V_5}{V_3 - 2V_4 + V_5}\right) \quad (6)$$

Therefore, the computing circuit 504 can compute the X-coordinate position $x_s$, by substituting the voltages $V_3$, $V_4$, $V_5$ and the known coordinate value $x_3$ of the detecting line 113c to the equation (6).

The computing circuit 504 then detects the voltage values around the peak from the values of induced voltages. This detection can be made, for example, by comparing the values of successive induced voltages. Assuming here that a voltage $V_k$ is greater than the preceding voltage $V_{k-1}$ and also greater than the succeeding voltage $V_{k+1}$, the voltage $V_k$ is judged to be a voltage closest to the peak, i.e., as the voltage $V_4$, while the voltages $V_{k-1}$ and $V_{k+1}$ are judged as being the voltages $V_3$ and $V_5$. The computing circuit 504 then computes the X-coordinate position $x_s$ in accordance with the formula (6) mentioned before, using the voltages $V_{k-1}$, $V_k$ and $V_{k+1}$ as the voltages $V_3$, $V_4$ and $V_5$, respectively, and using also the known coordinate value of the corresponding detecting line. The thus obtained X-direction coordinate value $x_s$ is delivered to and temporarily stored in the processor 700.

Then, the computing circuit 504 delivers a control signal to the switching circuit 506 and the multiplexer 140 through an output buffer 505, and successively receives the voltages induced in the Y-direction detecting lines 123a to 123h, and computes the Y-coordinate value $y_s$ in the same way as the computation of the X-direction coordinate position. The thus determined coordinate value $y_s$ is delivered to the processor 700. This operation is repeated so that the data of the positions successively appointed are obtained.

The position data constituted by X- and Y-direction coordinate values stored in the processor 700 is delivered to a display memory 602 through a control circuit 601 in the display control circuit 600, and is stored in a predetermined order. The data is then successively read in accordance with the timing pulses from the control circuit 601 and delivered to an X-direction driver 603 and a Y-direction driver 604. The X-direction driver 603 and the Y-direction driver 604 receive scanning pulses generated by a scanning circuit 605 in synchronism with the timing pulses. The drivers 603 and 604 then drive the electrodes on the display 300 corresponding to the X- and Y-direction coordinate values on the display 300, such that the position appointed on the tablet 100 is displayed at the identical position on the display 300. It is, therefore, possible that patterns and letters written by the magnetic pen 200 from the upper side of the display 300 on the tablet are displayed by luminescence in identical forms on the display 300.

If the processor 700 is provided with a suitable editing function, the edition such as addition and deletion of words and characters can be made easily. The device of the invention can be used also as a CAD or a CAM provided that a suitable pattern processing function is added. The device of the invention can be used also as a menu inputting device. It is possible even to obtain hard copies of the position data, i.e., hard copies of patterns and characters, provided that the device is connected to a known plotter or a printer through the processor 700.

Figure 10:
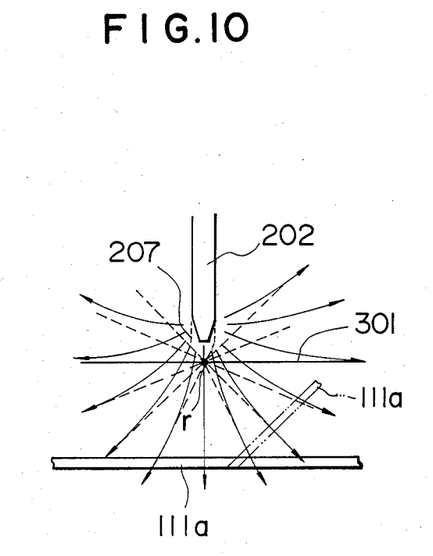
FIG. 10 is an illustration of the manner in which the position is appointed by a magnetic pen.

FIG. 10 shows the manner in which the position is appointed by means of the magnetic pen 200.

The magnetic flux emerging from the end of the bar magnet 202 of the magnetic pen 200 can be approximated by a magnetic flux which is assumed to be developed from a point r on the extension of the axis of the bar magnet 202. Therefore, if the input surface, i.e., the top surface 301 of the display 300, is formed within the distance r from the magnetic bodies 111a to 111e and 121a to 121e, and if the rubber cover 207 is formed such that the end of the cover is at the same position as the point r, the directions of the magnetic field with respect to the magnetic bodies 111a to 111e and 121a to 121e are not changed, even if the bar magnet 202 is inclined with respect to the magnetic bodies 111a to 111e and 121a to 121e. In FIG. 10, the bar magnet 202 is inclined with respect to the magnetic body 111a which is shown by two-dot-and-dash line. Thus, the position can be appointed safely substantially irrespective of the inclination of the bar magnet 202 with respect to the magnetic bodies. In fact, experiment showed that the position can be appointed within an error of less than ±0.5 mm when the bar magnet was inclined within the range of ±30° at the input plane height of 12 mm.

Although the invention has been described through specific terms, it is to be noted that the described embodiment is only illustrative and various changes and modifications may be imparted thereto.

For instance, the numbers of the magnetic bodies, exciting lines and the detecting lines in the described embodiments are only illustrative, and the apparatus of the invention can have any desired number of these constituents. Experiments show that a satisfactorily high precision of position detection can be attained when the detecting lines are arranged at a pitch of 2 to 6 mm. It is to be understood also that the bar magnet used in the described embodiments is not exclusive, and various other magnets such as a tabular magnet, ring magnet, polygonal magnet and even a solenoid can be used as the position appointing magnetism generator.

It is also possible to use optical signals such as infrared rays as the measurement commencement signal which is transmitted from the magnetic pen 200 to the position detecting circuit 500 in place of the supersonic signal used in the described embodiment. It is to be understood also that, although in the described embodiment the measurement commencement signal is delivered by the magnetic pen, this is not exclusive and the measurement commencement signal may be delivered from a switch circuit means such as a keyboard on the position detecting circuit 500, since the function of the measurement commencement signal is to inform the computing circuit 504 of the timing of detection of the coordinate data.

In addition, the display area formed on the display 300 need not always be equal to the input area on the tablet: namely, the display area may be smaller or greater than the input area.

What is claimed is:

1. A coordinate input device with a display comprising:
 a tablet having an X-direction position detecting section having elongated magnetic bodies and a plurality of exciting lines and a plurality of detecting lines which are arranged alternatingly such as to cross said magnetic bodies orthogonally thereto, and a Y-direction position detecting section having a construction similar to that of said X-direction position detecting section and superposed thereon;

a tabular display superposed on said tablet;

a position appointing magnetism generator adapted for imparting local biases to said magnetic bodies of said X- and Y-direction position detecting sections;

a driving current source adapted to apply A.C. current of a predetermined frequency to said exciting lines of said X- and Y-direction position detecting sections;

a position detecting circuit for detecting the coordinate values of a position appointed by said position appointing magnetism generator through detection of voltages induced in said detecting lines in said tablet;

a display control circuit for driving said display; and a processing means for controlling the operation of the constituents set forth above.

2. A coordinate input device with a display according to claim 1, wherein said magnetic bodies are made of an amorphous alloy.

3. A coordinate iput device with a display according to either one of claims 1 and 2, wherein said position magnetism generator is not connected by cord to any stationary portion of the device.

4. A coordinate input device with a display according to either one of claims 1 or 2, wherein said display is constituted by a matrix-type liquid crystal display panel having liquid crystal mediums interposed between a plurality of horizontal and vertical electrodes crossing each other.

* * * * *

UNITED STATES PATENT AND TRADEMARK OFFICE
CERTIFICATE OF CORRECTION

PATENT NO. : 4,631,356
DATED : December 23, 1986
INVENTOR(S) : Yoshinori Taguchi and Tsuguya Yamanami It is certified that error appears in the above-identified patent and that said Letters Patent is hereby corrected as shown below:

In the Abstract, bridging lines 15 and 16, "corrdinate" should be --coordinate--.

In the Abstract, line 18, change "voltage" to --voltages--.

In the Abstract, line 22, change "corrdinate" to --coordinate--.

Column 1, line 30, change "input/outpu" to --input/output--.

Column 2, line 59, change "s" to --a--.

Column 3, line 55, change "amorhous" to --amorphous--.

Column 4, line 39, change "10,120" to --110,120--.

Column 6, line 7, change "magent" to --magnet--.

Column 10, line 6, change "iput" to --input--.

Signed and Sealed this

Eighth Day of September, 1987

*Attest:*

DONALD J. QUIGG

*Attesting Officer*     *Commissioner of Patents and Trademarks*